United States Patent [19]

[11] 3,752,921

Audretsch, Jr. et al.

[45] Aug. 14, 1973

[54] DISTINCT COMPLEX SIGNALS FORMED BY PLURAL CLIPPING TRANSFORMATIONS OF SUPERPOSED ISOCHRONAL PULSE CODE SEQUENCES

[75] Inventors: Leo M. Audretsch, Jr.; Matthew Elsner, both of Poughkeepsie, N.Y.

[73] Assignee: International Business Machines Corporation, Armonk, N.Y.

[22] Filed: Nov. 4, 1970

[21] Appl. No.: 86,688

[52] U.S. Cl. .......................... 179/15 BC, 340/147 SY

[51] Int. Cl. .......................... H04j 1/00

[58] Field of Search .......................... 179/15 BC; 340/147

[56] References Cited

UNITED STATES PATENTS

| | | | |
|---|---|---|---|
| 2,641,740 | 6/1953 | Levy | 340/169 X |
| 3,653,029 | 3/1972 | Kuhlmann | 340/169 X |
| 2,878,317 | 3/1959 | Evans | 179/15 BC |
| 3,025,350 | 3/1962 | Lindner | 179/15 BC |
| 3,036,157 | 5/1962 | Franco | 179/15 BC |
| 3,394,224 | 7/1968 | Helm | 179/15 BC |
| 3,484,554 | 12/1969 | Gutleber | 179/15 BC |
| 3,488,445 | 1/1970 | Chang | 179/15 BC |
| 3,511,936 | 5/1970 | Saltzberg | 179/15 BC |

*Primary Examiner*—Harold I. Pitts
*Attorney*—Hanifin and Jancin and Robert Lieber

[57] ABSTRACT

Signal sources overlay coded pulse signals on a tapped transmission cable, forming thereby composite signals of unique form. Source signals are representations of distinct words of an orthogonal, biorthogonal or transorthogonal code. Each source selectively transmits its assigned code signal or no signal in each of a series of isochronous time intervals. The source signals are adjusted in phase and amplitude to equalize delay and attenuation effects in relation to receiving terminals. Composite signals are handled further in a clipped digital form in which the intelligence of the composite is singularly retained. At receiving terminals the clipped composite is analyzed by digital matched filter circuits.

8 Claims, 16 Drawing Figures

INVENTORS
LEO M. AUDRETSCH, JR.
MATTHEW ELSNER
BY Robert Lieber
ATTORNEY

DISTINCT COMPLEX SIGNALS FORMED BY PLURAL CLIPPING TRANSFORMATIONS OF SUPERPOSED ISOCHRONAL PULSE CODE SEQUENCES

SUMMARY OF THE DISCLOSURE

Separated peripheral device units and input-output channel units of a data processing system exchange intelligence by directed transmissions of additively superimposed pulse code modulated signals. The individual pulse transmissions are produced selectively in undivided isochronal time intervals and carried as an amplitude-multiplexed composite upon a shared cable. In each undivided interval transmitting units selectively couple to the cable, or fail to couple, respectively allocated sequences of pulse code modulated signals. Coupling and non-coupling of an allocated modulation sequence serves to represent respective 1 and 0 bit states of binary transmission intelligence of the orignating unit. Allocated sequences correspond to words of a particular pulse code. Transmission intervals are established with relative phase differences at the multiplexed transmitting units such that contemporary unit transmissions become identically superimposed as they propagate along the cable. Consequently, individual pulses combine by algebraic addition of amplitudes into composite pulses which have a multi-amplitude (i.e. amplitude-multiplexed) modulation sequence in each interval. Commonly directed transmissions of individual transmitting units are progressively attenuated in initial amplitude in the directional succession of the transmitting units. Installation adjustments of the transmitting units relative to a common receiving unit establish unit transmissions at relatively equal levels relative to the receiving unit. Demultiplexing is accomplished by standard binary threshold circuits and binary logic circuits. For a particular transorthogonal pseudo-noise code of length seven circuits are used to convert the sequence of composite multiamplitude pulses on the cable into a uniquely corresponding sequence of pairs of binary pulse signals. The binary signal pairs have a ternary range of combined states selected to represent uniquely the amplitude states of corresponding signal pulses of the composite. The three ternary states are assigned respectively to composite pulses which respectively exceed, are bounded by or are exceeded by predetermined upper and lower amplitude limits. The ternary representation of the composite is analyzed by a digital matched filter circuit composed exclusively of standard binary logic elements (Ands, Ors, Counters, etc.). The filter circuit calculates the cross correlation coefficient of the ternary signal and a binary reference signal produced at the analyzing terminal. The successive coefficients are translated into binary signals corresponding to the original binary intelligence represented by the transmission of the one transmitting unit which presently has allocated to it the code word corresponding to the binary reference signal.

BACKGROUND OF THE INVENTION

1. Field of the Invention

The invention relates to multiplex pulse signalling systems. In particular the invention pertains to a form of multiplex signalling in which concurrent pulse coded directional transmissions of plural terminals are combined in one channel of communication into a directionally propagated transmission of multiamplitude (i.e. amplitude multiplexed) composite signals. The invention moreover contemplates conversion and handling of the composite transmission in a reduced (e.g. ternary) form having unique correlation with the original composite. The reduced composite is demultiplexed with considerable fidelity by digital matched filter circuit arrangements composed of an unexpectedly small complement of standard binary logic circuit elements.

2. Description of the Prior Art

There is much art pertaining to multiplex pulse signalling by frequency and time division methods. In the time (frequency) division method individual subscribers are allocated distinct time 2. Description of the Prior Art There is much art pertaining to multiplex pulse signalling by frequency and time division methods. In the time (frequency) division method individual subscribers are allocated distinct time (frequency) slots (bands, channels) for respective pulse transmissions. An alternate technique affording access, timing and bandwidth usage advantages is disclosed in U. S. Pat. No. 3,432,619, granted to H. L. Blasbalg on an application filed July 31, 1963 which is assigned to the assignee of the present application. Blasbalg's subscribers, in asynchronous fashion, selectively produce undirected transmissions having a quasi-orthogonal relation. At receivers the randomly composited transmissions are converted to binary pulse samples which are analyzed by digital matched filter circuits. One problem inherent in the Blasbalg method is that there is not a unique relation of correspondence between the binary pulse samples and the original composite. While the associated uncertainty of analysis may not be objectionable for an application such as sampled voice communication it could be less than satisfactory for communications requiring tighter control of the recovered intelligence; for example processing of precision data through a computer network.

Accordingly the present invention seeks to provide a system and method embodying the timing and rapid access advantages of the Blasbalg technique with signal to noise signalling quality comparable to conventional time and frequency division techniques.

SUMMARY OF THE INVENTION

A prime object of this invention is to provide an efficient system of controllably timed intelligence transmission characterized by equal and instant availability to all transmitting terminals, as contemplated by Blasbalg, and simplicity and fidelity of reception comparable or superior to ordinary time division demultiplexing.

In its most basic aspect the invention contemplates: establishment of isochronous transmission intervals, with progressively advanced phase, at a succession of directionally ordered stationary transmitting terminals which are directionally coupled to a common transmission channel; each terminal selectively coupling or not coupling an associated series of pulse code modulated signals to the common channel in each respectively established interval the coupled signals becoming superimposed, due to the progressive phasing of interval establishment, and propagating in a common direction in said channel as a multiamplitude composite pulse modulated signal having pulse modulation amplitudes corresponding to sums of the amplitudes of correspondingly ordered pulses in the individually coupled signals; the coupled signals having unique waveforms corresponding to code words of one orthogonal, biorthogonal or transorthogonal code; the individual coupled signals having progressively decreasing pulse modulation amplitudes adjusted to contribute relatively equal absolute magnitudes of amplitude increments to the propagational composite; modification of the composite to a modified composite signal having a smaller range of amplitude variation than the composite yet correlating uniquely with the composite; and analysis, or further transmission handling followed by analysis, of the modified composite signal by digital matched filter circuits of unique design.

Ancillary features include:

- coupling and non-coupling of said pulse code modulated signal series by individual transmitting terminals in order to represent complementary bit states of binary transmission intelligence of respective terminals;
- establishment of amplitude regulation by individual installation adjustments of transmitting terminals relative to one receiving terminal;
- establishment of timing coordination by recurrent transmission of a particular code word signal sequence from one terminal to all other terminals;
- provision of signal switching means and directional coupling means between each terminal and the shared transmission cable to reduce interference between oppositely directed transmissions;
- provision of additional receiving terminals coupled to said cable for receiving said transmissions of said transmitting terminal and said signals for establishment of timing coordination;
- varying allocations of code word representations to enhance transmission efficiency;
- adaptation of foregoing to form a reduced cabling system of intelligence transmission between peripheral device units and input-output channel units of a data processing system.

The foregoing and other objects, features, applications, and attendant advantages of the invention will be more fully appreciated and understood by referring to the following detailed description and accompanying drawings.

DETAILED DESCRIPTION OF THE DRAWINGS

FIG. 1 contains a legend showing symbols and drawing conventions which are employed herein;

DETAILED DESCRIPTION OF PREFERRED EMBODIMENTS INTRODUCTION

The present invention concerns a system of amplitude multiplex signalling in isochronous time intervals. The system is based upon selective transmission and superimposed combination of multiple pulse code modulated signal waveforms of predetermined relative form and equal duration. Composite signal transmissions are formed by combination of component pulse code modulated signals. The component signals are representations of code words of a code selected from a particular class of codes. The composites have unique correlation with associated component representations. Exhaustive calculations indicate that the composite signals can be modified and handled in a simpler (e.g. ternary) signal form having a smaller range of variation without loss of correlation correspondence. Systems based upon use of such signals can have advantageous noise rejection, access timing and economy of reception in comparison to prior signalling methods discussed above.

Codes useful as a basis for the foregoing composite signalling method include the orthogonal, biorthogonal and transorthogonal codes. As used herein the term orthogonal code characterizes a set of code words having zero cross-correlation for every pair of non-identical words and auto correlations of $n$ for individual words; where n is the code length. A biorthogonal code is a set of code words having either 0 or $-n$ cross—correlation for each pair of non-identical words and $+n$ auto correlation for individual words. A transorthogonal code is a set of code words having cross-correlation $-1$ for every pair of non-identical words and $+n$ auto correlation for individual words. An interesting aspect of amplitude multiplex signalling as described herein is that it permits efficient use of bandwidth in a shared pulse transmission facility and at the same time provides transmitting terminals with virtually instantaneous unilateral access to the facility; even, in appropriate instances, without acknowledgement from intended receiving terminals.

EXAMPLE OF PREFERRED EMBODIMENT-PN CODE LENGTH 7

A. General Description

Figure 1:
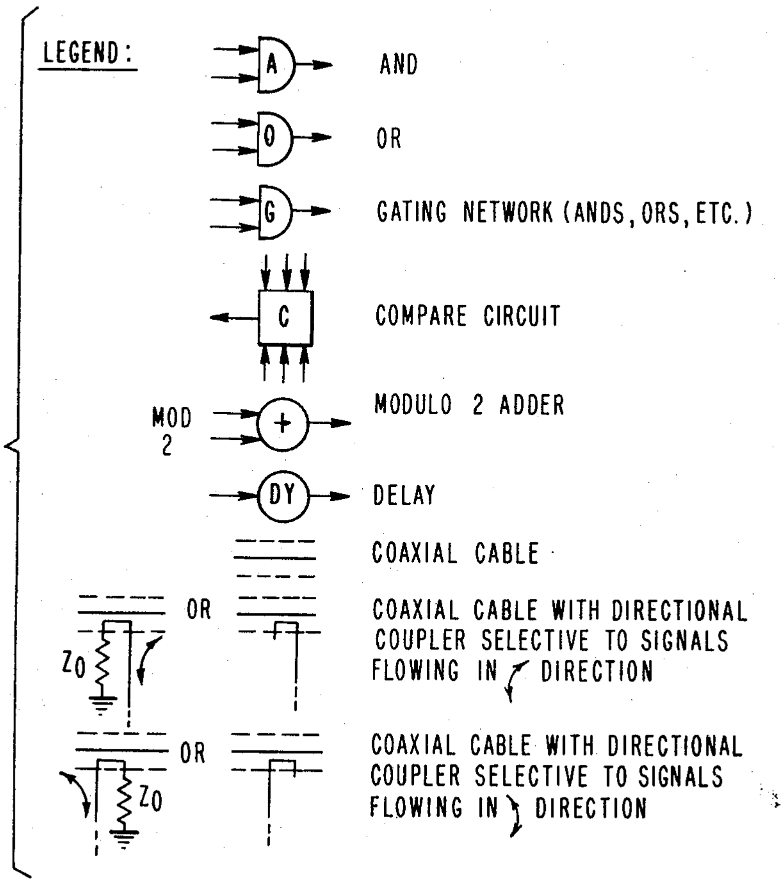
Figure 2:
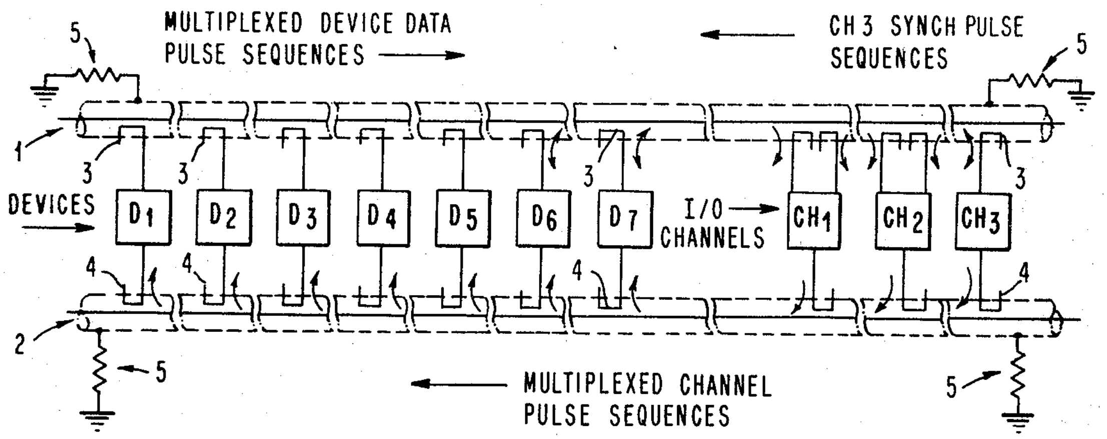
FIG. 2 is a generalized schematic of one highly useful form of application of the invention to the problem of accomplishing signalling between plural peripheral device units and plural input-output channel units of a digital data processing system with reduced cabling between units.

FIG. 2 which incorporates symbols explained in FIG. 1 illustrates a preferred applicational embodiment of the present invention based upon the use of a particular transorthogonal pseudo-noise (PN) code of length 7 (i.e. 7 bits or pulse elements per word) as specified in detail hereafter. Terminal units D1–D7 represent separated peripheral device units of a data processing system installation. These are coupled in succession, for amplitude-multiplex signalling in accordance with the invention, to a cable 1 which consists for example of a single coaxial transmission line. Cable 1 is also coupled in succession to units CH1, CH2 and CH3, which represent input/output channel units serving as intermediaries of communication between the peripheral device units D1-D7 and a central processor (not shown).

In this particular embodiment two coaxial cables, 1 and 2, are provided. Cable 1 is used to convey pulse code modulated intelligence signals isochronously from the device units to the channel units in an amplitude multiplexed composite form and to convey unmultiplexed pulse code modulated synchronizing signals in the reverse direction from CH3 to the other channel units and to each of the device units. Cable 2 is used to convey pulse code modulated intelligence signals isochronously, in amplitude multiplexed composite form, from the channel units to the device units. An embodiment discussed later uses a single cable to convey all intelligence and synchronizing signals between units in multiplex form.

Device units D1–D7 utilize respectively allocated code words of one PN code as respective multiplex channels of communication with the channel units. Each manifestation of an allocated code word representation which is coupled to cable 1 from a respective device unit constitutes a transmission of a bit of intelligence of particular value; e.g. binary 1. Complementary bit states (e.g. binary 0) are implicitly manifested by non-transmission of the allocated code word representation in available transmission intervals. A similar allocation and utilization of code words is made for handling multiplex transmissions from channel units to device units over cable 2.

Device unit transmissions to cable 1 are adjusted to have equal amplitudes relative to receiving terminals in the channel units, in order to compensate for the different unit attenuation distances. Channel unit tranmissions on cable 2 are similarly adjusted relative to a common device unit receiving circuit.

The isochronous intervals for multiplex pulse transmissions are relatively displaced in phase at the participating units so that there is pulse for pulse coincidence on the shared cable of pulses originating from different sources.

Device unit pulse transmissions are directionally coupled to cable 1 and thereby propagate preferentially towards the channel units. Thus, for example when D1 and D2 transmit respectively allocated code waveforms in the same interval, the individual pulse signal elements of the waveform allocated to D2 are coupled to cable 1 just as the corresponding signal elements of the waveform originated by D1 pass the coupling juncture between the cable and D2. Likewise, D3 places signal elements of its allocated waveform of transmission upon cable 1 in precise spatial registration with corresponding elements of contemporary selective transmissions of D1 and/or D2. By extension elements of transmissions of D4, D5, D6 and/or D7 are timed to register spatially upon cable 1 with corresponding elements of selective transmissions originated by lower numbered units.

Device units and channel units are a.c. coupled to cables 1, 2 through respective directional coupler arrangements 3,4. The steady state (D.C.) condition of each cable line is a zero voltage derived through ground terminations such as 5. Thus, device unit bit transmissions are manifested by appropriately timed conveyance to respective couplers 3 of the specific pulse waveforms allocated to respective device units. Since a code of length 7 is employed in the present instance, each allocated modulation waveform consists of seven discrete pulse elements. Accordingly phased isochronous transmission intervals established at the various signalling units will have durations sufficient to accommodate 7 pulse elements. With pulse contributions of the units relatively equalized in amplitude, and regulated in time to coincide on the cable, it is seen that the composite transmission in each interval is a sequence of multiamplitude (i.e. amplitude multiplexed) pulses the amplitudes of which are related to the algebraic sums of the amplitudes of the individual contributions.

B. Device Unit Organization

Figure 3:
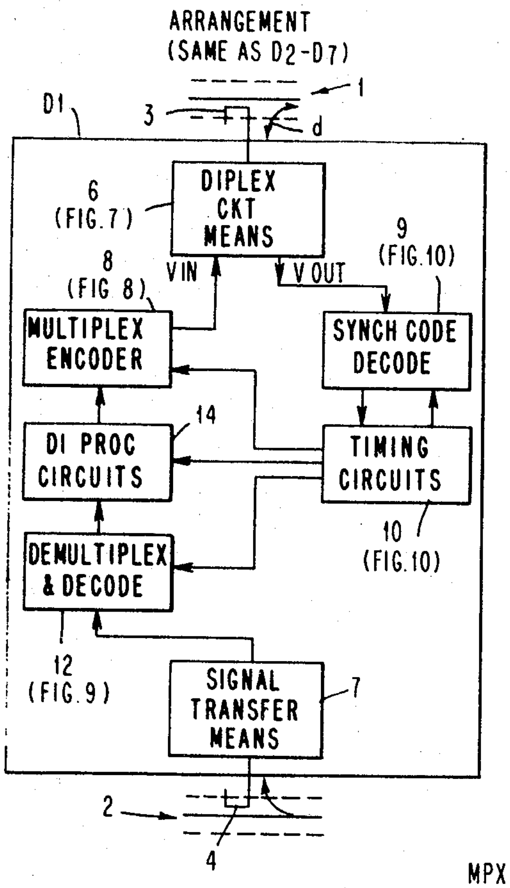
FIG. 3 is a schematic block drawing of a representative peripheral device unit D1. Since device units D1–D7 shown in block form in FIG. 2 have substantially identical construction, for present amplitude multiplexed signalling functions, disregarding numbering of parts this Figure serves as well to illustrate the construction of each of the units D2–D7.

Referring to FIG. 3 device units D according to the specific instant embodiment contain respective diplex signal switching circuit means 6 interfacing with cable 1 through respective directional couplers 3 and respective simplex signal transfer means 7 interfacing with cable 2 through respective directional couplers 4. Means 6 (shown in FIG. 7) operates to transfer signals bi-directionally, without interference, between internal circuits of the respective device unit and cable 1. Outgoing intelligence signals are transferred from device unit encoding means 8 (shown in FIG. 8) to cable 1. Incoming synchronizing signals originating at CH3 (note FIG. 2) are transferred via cable 1 to device unit decoding means 9 (shown in FIG. 10).

Arrow d indicates the preferential directions of signal propagation associated with couplers 3. Device unit outputs are directed towards the channel units and synchronizing pulses from CH3 are directed preferentially towards the device units. Decoding means 9 includes a digital matched filter circuit for distinguishing the phase and form of the CH3 synchronizing signals. Corresponding reference timing pulses are generated and transferred to device unit timing circuits 10 (also shown in FIG. 10) to control the timing of device unit transmissions to cable 1 and device unit receptions from cable 2.

Figure 9:
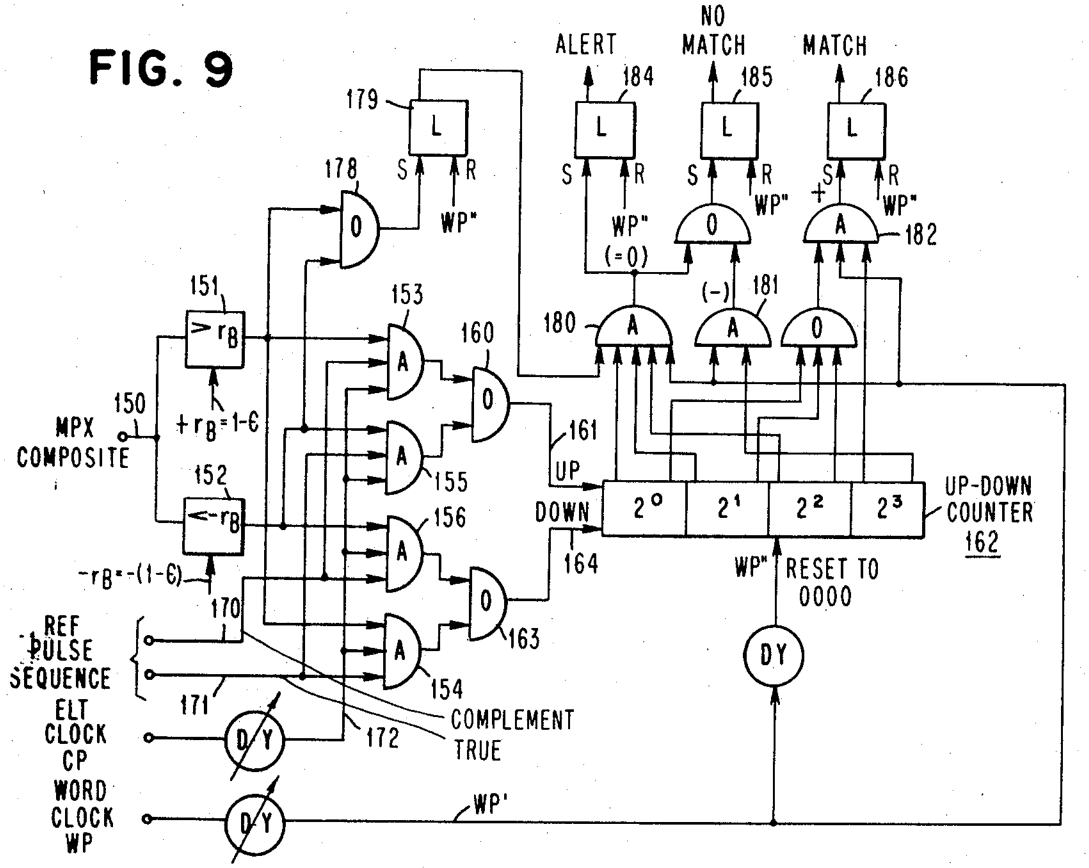

Circuit means 7 transfers multiplexed channel unit signals from cable 2 to device unit demultiplexing/decoding circuits 12 (shown in FIG. 9). Circuits 8 and 12 are coupled to internal processing circuits 14 of the device unit; for example tape storage, disk storage, etc.

In device unit transmission operations circuits 8 of active device units receive isochronously timed 1 and 0 bit signals serially from internal process circuits 14 and convert each 1 bit into a seven element pulse code modulated signal corresponding to the PN code word representation allocated to the device unit. Corresponding code modulated signals, suitably timed, gated and adjusted in amplitude are transferred to the channel units via means 6, coupler 3 and cable 1.

In device unit receiving operations amplitude-multiplexed composite signals formed isochronously by calling channel units are transferred to circuits 12 of called device units via cable 2, coupler 4 and means 7. Circuits 12 analyze the composite by cross-correlation relative to an internally produced reference signal and reconstruct original intelligence of the calling channel units. Reconstruction intelligence bits are transferred from circuits 12 to internal device unit processing circuits 14.

The technique of amplitude adjustment whereby outputs of calling units are relatively equalized in amplitude with respect to called units is discussed later. Likewise, the technique for controlling the relative timing of calling unit transmissions to obtain spatial coincidence of unit pulses for additive composition, is explained in depth later.

C. Channel Unit Organization — CH1, CH2

Figure 4:
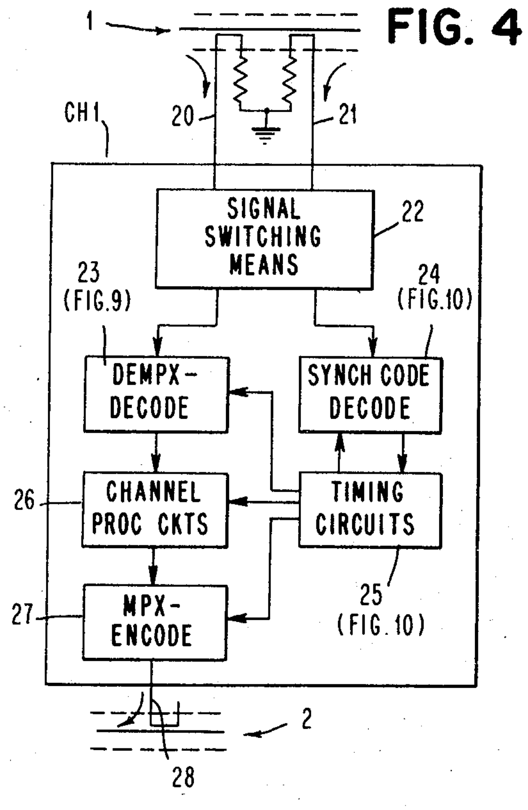
FIG. 4 is a schematic block drawing of the channel unit CH1 of FIG. 2, which serves as well to illustrate the channel unit CH2, as units CH1 and CH2 have substantially identical constructions in respect to present multiplex signalling functions.
Figure 10:
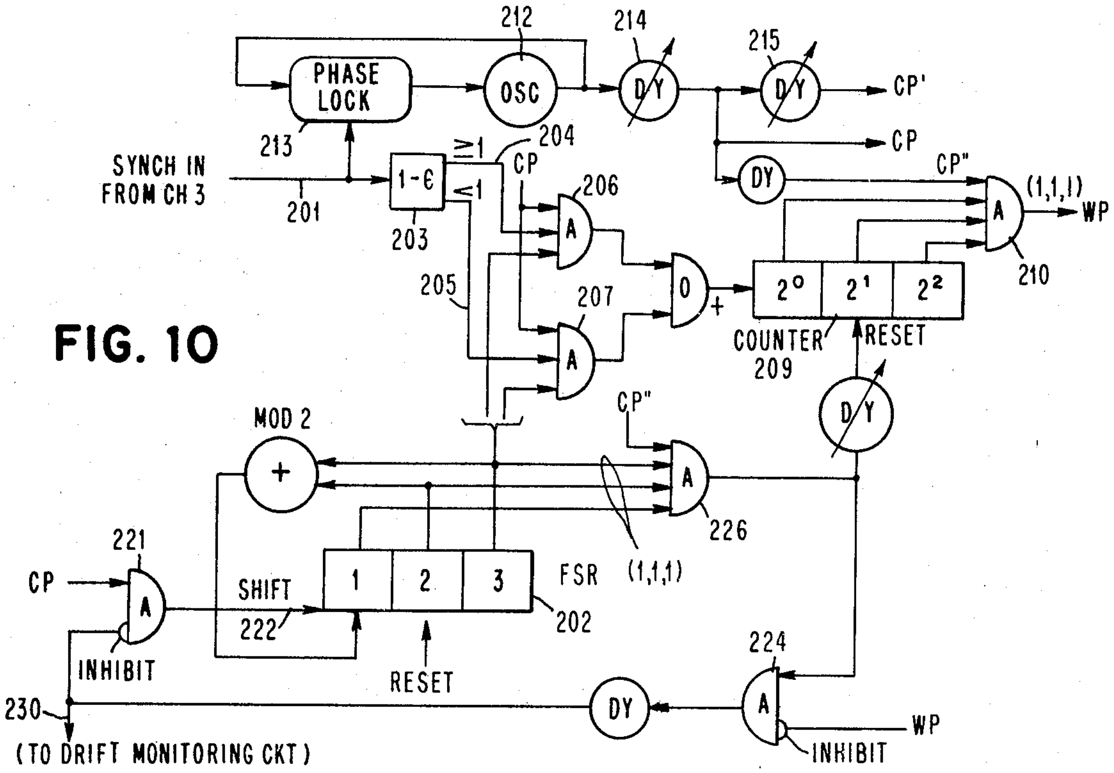

Channel units such as CH1 and CH2 are organized generally along the lines suggested in FIG. 4. Directional couplers 20 and 21 are coupled to receive oppositely directed signals from cable 1. Couplers 20 couple device unit composite transmissions, via signal switching means 22, into demultiplex/decoding circuits 23 similar to circuits 12 (FIGS. 3, 9). Synchronizing signals originated by CH3 are transferred, via directional couplers 21 and switching means 22, to decoding circuits 24 which are generally similar to synch decoding circuits 9 (FIGS. 3 and 10). Circuits 24 derive synchronizing signals from the coded transmission of CH3. The derived signals are applied as reference timing pulses to timing circuits 25 which correspond generally in construction and function to timing circuits 10 (FIGS. 3, 10).

Demultiplexed device unit intelligence analyzed and selected by circuits 23 under control of timing signals from circuits 25 is delivered, in a signal form corresponding to the form of signals handled by process circuits 14 (FIG. 3) of source device units, to process circuits 26 of respective linked channel units. Process circuits 26 exchange intelligence with the not shown central processing unit of the system by separate means also not shown.

Outgoing transmissions of CH1, CH2 originate in the internal process circuits 26 as binary 0 and 1 bit signals isochronously timed by circuits 25. Each 1 bit is selectively encoded by circuits 27, under control of circuits 25, into a group of seven appropriately timed code modulated pulses which correspond in form to the PN code word allocated to the destination (i.e. called) device unit. The encoded signals, relatively adjusted in amplitude, are directed by couplers 28 to cable 2 and proceed thence to the device units.

D. CH3 Organization

Figure 5:
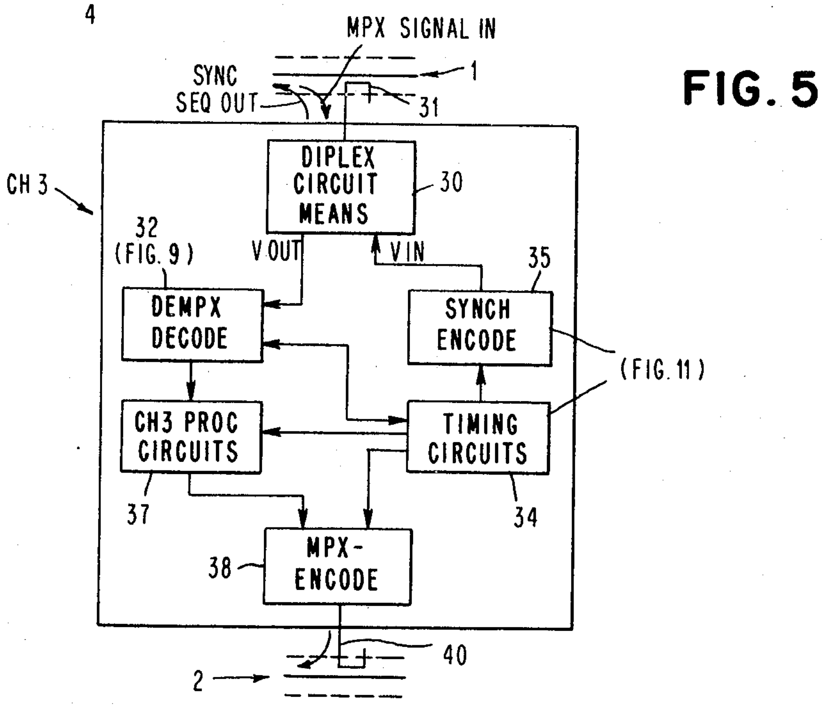
FIG. 5 is a block schematic of the channel unit CH3 of FIG. 2 the construction of which differs slightly from that of units CH1 and CH2.
Figure 11:
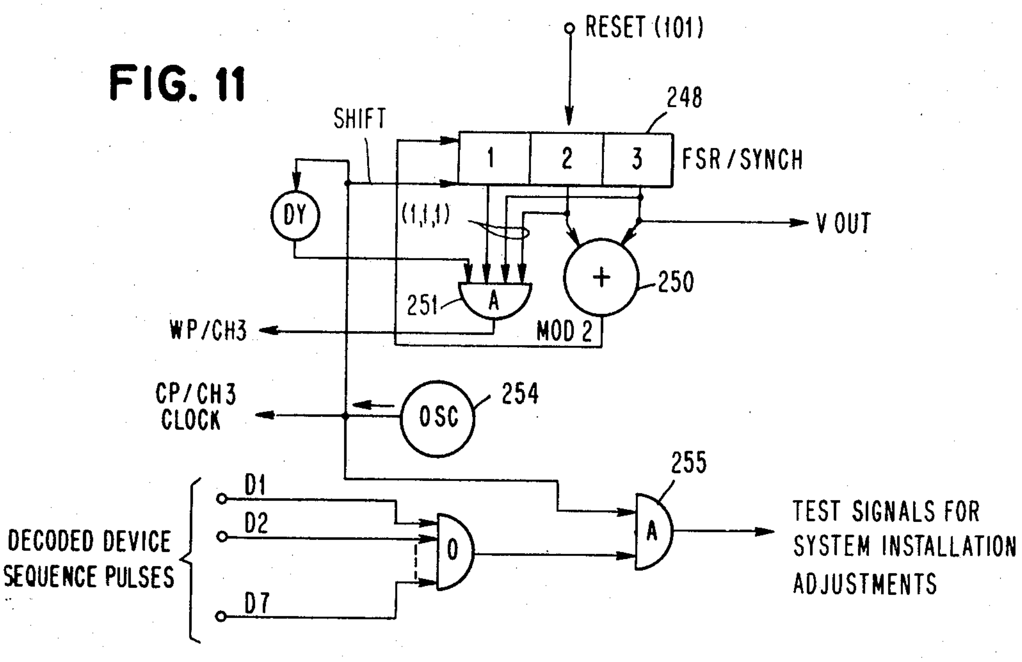

Internal organization of CH3 is indicated separately in FIG. 5. Signals are bidirectionally coupled between diplex signal switching circuit means 30 and cable 1 by directional coupler 31. Device unit composite transmissions are directed from the cable into demultiplexing/decoding circuits 32. Code word timing signals originated internally by timing circuits 34 (detailed schematically in FIG. 11) are encoded in and sent to the cable from circuits 35 (FIG. 11). The output of circuits 35 is a representation of one of the code words of the PN code in which intelligence transmissions are represented.

Figure 8:
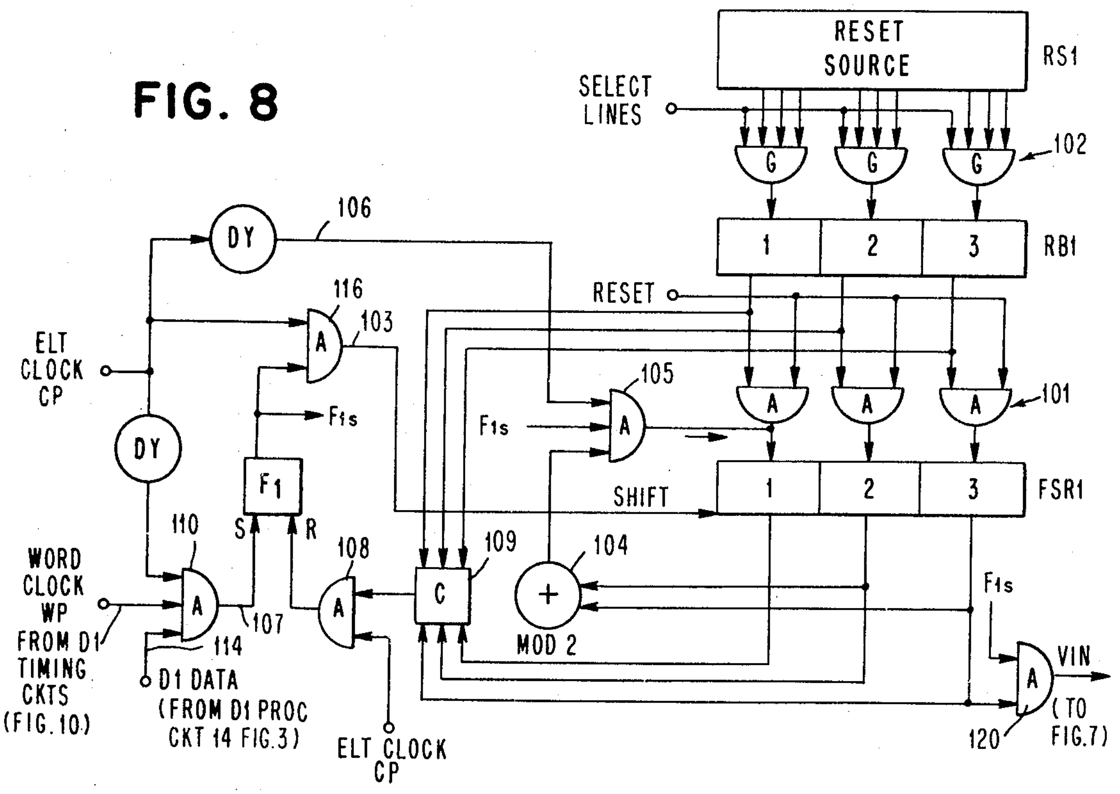

Binary intelligence reconstructed by circuits 32, is transferred for central process handling to internal processing circuits 37. Circuits 37 also supply intelligence to encoding circuits 38 for outgoing transmissions on cable 2. Circuits 38 are functionally and constructionally similar to encoding circuits 27 (FIG. 4) and 8 (FIGS. 3, 8). Directional coupler 40 functionally identical to directional coupler 28 (FIG. 4) directs the outgoing transmissions to cable 2 in the direction of the device units.

E. Signal Waveforms and Timing Considerations

Figure 6:
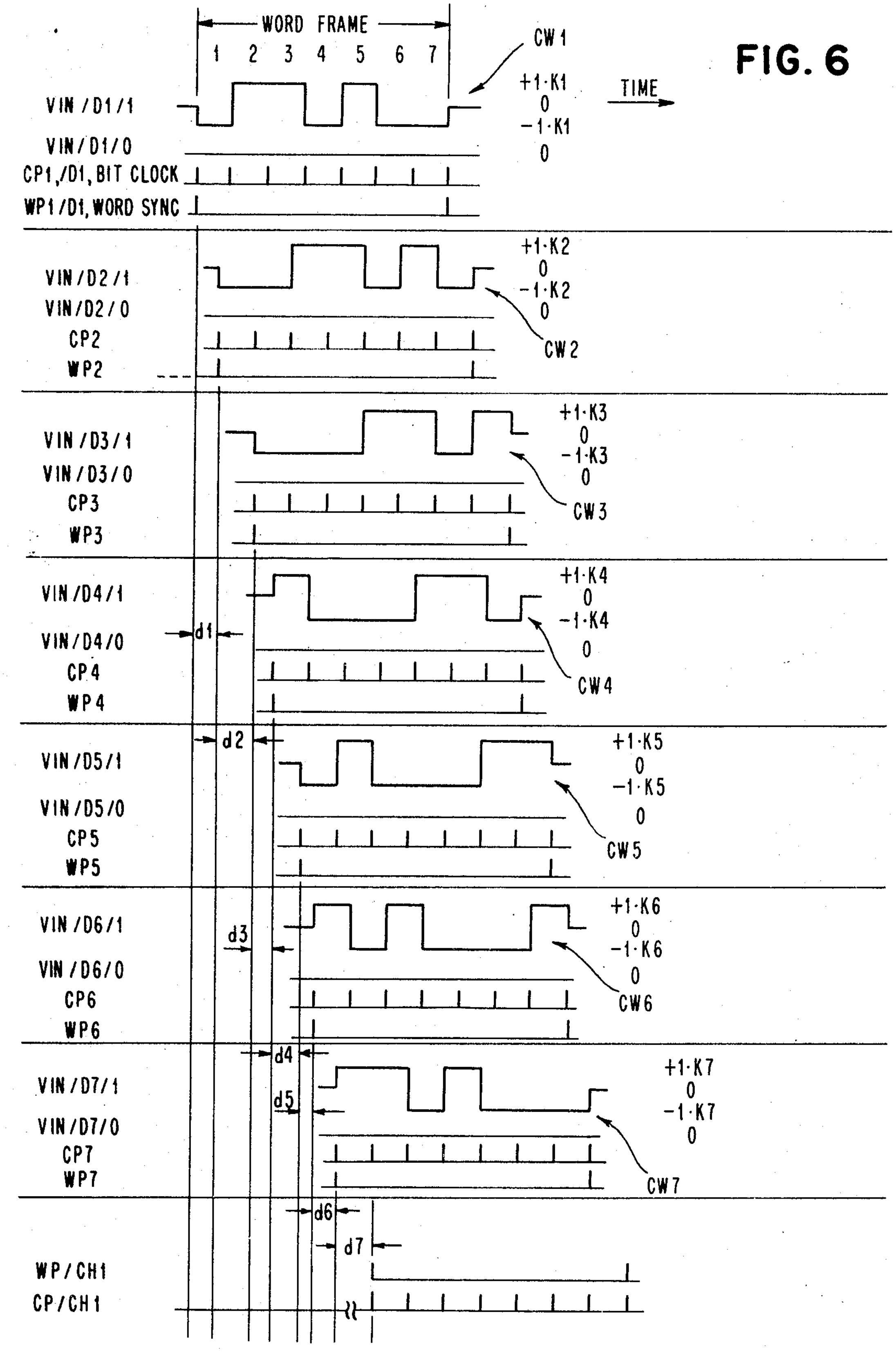
FIGS. 6 and 13 show intelligence and timing signal waveforms associated with foregoing device and channel units.
Figure 13:
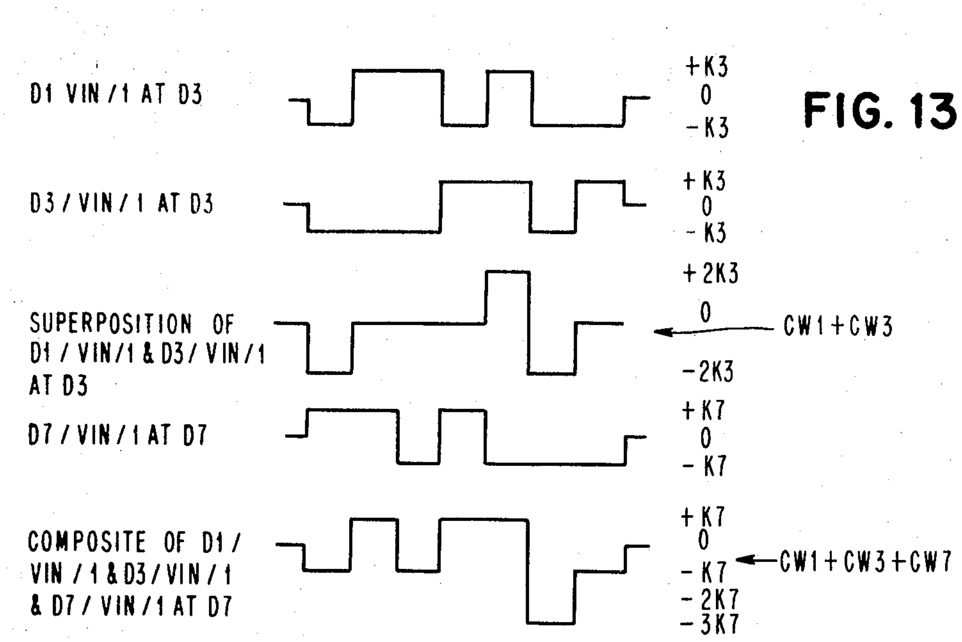

Signal waveforms and timing considerations pertinent to foregoing transmission process are indicated in FIGS. 6 and 13. Word (WP) and clock (CP) timing pulses (e.g. WPj/Dj, CPj/Dj in device units and WP/CH*k*, CP/CH*k* in channel units) establish fundamental isochronous transmission intervals in respective units to coordinate transmission and reception functions. Code words CW1–CW7 of a PN code as described below are allocated to the device units and channel units for respective transmission operations. Methods of code word allocation, alternately on a fixed or a dynamically varying basis, are discussed later.

Pulses WP*j*, CP*j* of individual units D*j* involved in the formation of one particular composite are observed to be relatively displaced in phase by amounts $d(j\text{-}1)$ proportionate to distances between units taken in the direction of transmission. Phase difference *d*7 is proportionate to the distance separating CH1 and D7. Code word transmission intervals defined by pulses WP include seven discrete code bit transmission intervals defined by respective clock pulses CP. As indicated in the drawing the PN code representation for a 1 bit transmission (Vin/1) of each unit comprises a sequence of mark pulses (+K) and space pulses (−K) patterned to correspond to the allocated PN code word CW and timed by associated clock pulses CP. Binary 0 transmissions (Vin/0) and idle states generally are represented by a constant output (non-transmission) from the respective unit.

Pulses of respective units Dj (CHk) have respective amplitude parameters ±K*j* (±K*k*). The magnitudes K*j* (K*k*) are adjusted in a manner described later so that unit contributions to the multiple composite signal are effectively equal, as indicated in the exemplary composite waveforms of FIG. 13.

F. Signal Switching and Transmission Considerations

Figure 7:
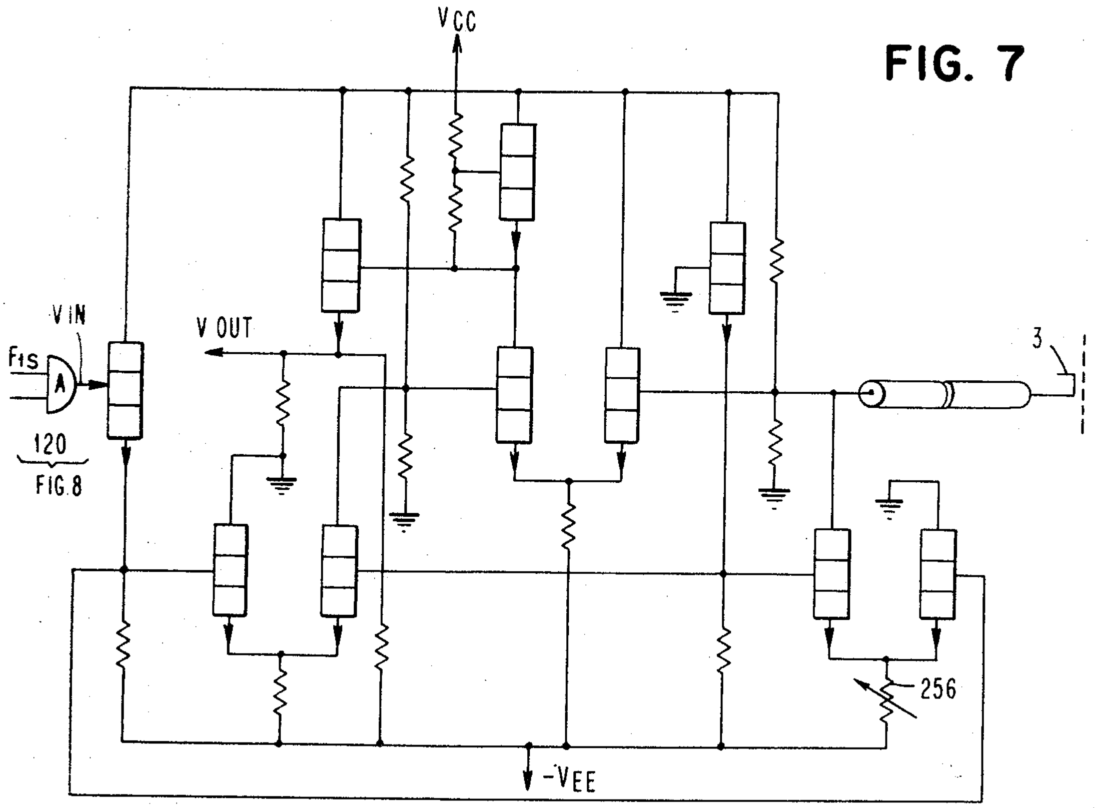
FIGS. 7–11 are circuit level schematics of various parts of the device and channel units represented in block form in FIGS. 2–5.

FIG. 7 shows the construction of diplex signal switching circuit means designated by 6 in FIG. 3 and 30 in FIG. 5. Such means are fully specified and described in the co-pending application Ser. No. 844,528, D. J. DaCosta et al., "Simultaneous Bi-Directional Transmission System", filed July 24, 1969, the disclosure of which is incorporated herein by this reference. For the present purpose it is sufficient to note that the circuit serves to provide non-interfering switching paths for bi-directional transferral of signals between internal circuits of the respective unit and respective cable couplings.

G. Multiplex Signal Encoding

FIG. 8 indicates the construction of multiplex encoding circuits as contemplated at 8 in FIG. 3, and at 27 and 38 in FIGS. 4 and 5, respectively. Although the circuit shown is designated as a section of device unit D1, by appropriate generalization of subscripts corresponding circuits of respective device units D*j* or channel units CHk are immediately comprehended.

Register FSR1 is a 3-stage feedback shift register which can be made to have cyclically repetitious shift sequences when set to appropriate initial states. Initial states are established by parallel transfer of the content of 3-stage buffer register RB1 to FSR1 through gates 101 under control of signals on the line designated "Reset". Content of RB1 is pre-established by selection gates 102 in one of a plurality of initial state conditions presented by plural sources RS1.

The foregoing though rather elaborate has specific utility for establishing a variety of initial shift states in FSR1 for purposes considered later. Quite obviously if one and only one initial state had been required gates 101, 102 and RS1 and RB1 could have been eliminated and the line designated "Reset" could have been coupled directly to appropriate inputs of the individual stages of FSR.

After initial setting FSR1 is shifted by shift pulses conveyed conditionally to line 103. Upon successive shifts stage 3 of FSR1 assumes previous states of stage 2, stage 2 assumes previous states of stage 1, and stage 1 assumes states corresponding to the modulo 2 sums of the previous states of stages 2 and 3. The signal representing this sum is produced by modulo 2 adder 104 and transferred conditionally to FSR1 stage 1 through And 105. And 105 is conditioned by a delayed element clock pulse on line 106 coincident with a signal level of appropriate binary magnitude at F1*s*. F1*s* extends from the correspondingly denoted (set) output of flip-flop F1. Flip-flop F1 is conditioned to set state S (F1s active) by pulses of suitable polarity on line 107 and to reset state R (F1s inactive) by pulses conveyed from And 108.

And 108 is conditioned by bit clock pulses CP coincident with output at Compare circuit 109, the latter being activated only when the varying state of FSR1 coindices with the relatively constant state of RB1.

Set pulses are conveyed to F1 from And 110. And 110 is activated by coincidence of a bit clock pulse (CP), a word clock pulse (WP) and a pulse signal level at 114 representing a 1 bit of process intelligence to be encoded for transmission. Line 114 extends from D1 process circuits 14 (FIG. 3). With F1 in state S And 116 is enabled to transfer delayed element clock pulses to FSR1 as shift signals.

Accordingly at commencement of word transmission intervals coinciding with manifestation of a 1 bit at 114 F1 is set to state S releasing shift pulses to FSR1 which shift FSR1 until it cycles to the state corresponding to the content of RB1. F1 is reset to state R and if a 0 bit is then manifested at 114 further shifting of FSR1 is blocked. Shifting thereafter resumes only when a 1 bit is again manifested at 114.

And 120, conditioned by state F1s conveys output of FSR1 stage 3 to "$V_{IN}$" terminal of diplex circuits 6 (FIGS. 3, 7). Circuits 6 transfer corresponding signals, at suitably amplified levels, to directional coupler 3 (see FIGS. 1, 3, 7). Coupler 3 couples these signals to cable 1.

Suppose then that the three stages of RB1 hold respective binary states: 1, 0, 0, so that FSR1 is set to a corresponding initial state: 1 0 0. The associated FSR1 shift sequence, for a 1 bit at 114, would be:

1 0 0
0 1 0
1 0 1
1 1 0
1 1 1
0 1 1
0 0 1
1 0 0

In this shift sequence, stage 3 of FSR1 traces the sequence of states: 0, 0, 1, 0, 1, 1, 1. Correspondingly, diplex circuits 6 and directional coupler 3 (FIG. 3) would convey to cable 1 (FIG. 3) a sequence of pulse signals with amplitudes: +K1, +K1, −K1, +K1, −K1, −K1, −K1, where K1 is an adjusted pulse amplitude level (voltage or current) associated with device unit D1.

It will be observed that if the initial state of FSR1 had been selected instead to be 0 1 0, FSR1 stage 3 would have traced the sequence of shift states: 0 1 0 1 1 1 0. More generally the following table indicates shift states of FSR1 stage 3 and associated code word sequences (CWj) derived from indicated initial state settings of FSR1.

TABLE

| Initial State of FSR1 | Successive Shift States of Stage 3 | Code Word |
|---|---|---|
| 0 0 1 | 1 0 0 1 0 1 1 | CW1 |
| 0 1 1 | 1 1 0 0 1 0 1 | CW2 |
| 1 1 1 | 1 1 1 0 0 1 0 | CW3 |
| 1 1 0 | 0 1 1 1 0 0 1 | CW4 |
| 1 0 1 | 1 0 1 1 1 0 0 | CW5 |
| 0 1 0 | 0 1 0 1 1 1 0 | CW6 |
| 1 0 0 | 0 0 1 0 1 1 1 | CW7 |

Above code word shift sequences are seen to comprise a transorthogonal code of length 7 with individual sequences CWj representing different words of the code. As each device unit and channel unit is equipped with at least one encoding network such as that shown in FIG. 8 it is seen that each unit can be conditioned to produce signals corresponding to any of the indicated CWj code word sequences.

H. Composite Multiplex Transmissions

It is seen therefore that for one specific allocation of code word assignments device unit contemporary transmissions corresponding to binary 1 intelligence would have the form suggested in FIG. 6:

D1: −K1, +K1, +K1, −K1, +K1, −K1, −K1 (=CW1)
D2: −K2, −K2, +K2, +K2, −K2, +K2, −K2 (=CW2)
D3: −K3, −K3, −K3, +K3, +K3, −K3, +K3, (=CW3)
D4: +K4, −K4, −K4, −K4, +K4, +K4, −K4 (=CW4)
D5: −K5, +K5, −K5, −K5, −K5, +K5, +K5 (=CW5)
D6: +K6, −K6, +K6, −K6, −K6, −K6, +K6 (=CW6)
D7: +K7, +K7, −K7, +K7, −K7, −K7, −K7 (=CW7)

Where the signal amplitudes (voltage or current) Kj (*j*=1,2,-7) represent relatively equalized output pulse amplitudes established at respective device units Dj by individual adjustments relative to CH3.

Thus, if we assume for instance (see FIG. 13) that in one particular word transmission interval only device units D1, D3 and D7 have binary 1 intelligence for transmission. The composite intelligence transmission S1, 3, 7 formed on cable 1 at the coupling juncture of device 7 would consist then of seven pulses having amplitudes:

S1,3,7: (−K1′−K3′+K7), (+K1′−K3′+K7), (+K1′−K3′−K7),
(−K1′+K3′+K7), (+K1′+K3′−K7), (−K1′−K3-′−K7),
(−K1′+K3′−K7), where K1′ and K3′ represent attenuated levels of K1 and K3 respectively after propagation of transmissions of D1 and D3 respectively through the cable 1 over respective separation distances to the coupling juncture of D7.

Since the device outputs Kj above are adjusted individually to be equal after such relative attenuation it will be seen that $$K1' = K3' = K7;$$

and therefore S1,3,7 reduces to the sequence:

−K7, +K7, −K7, +K7, +K7, −3K7, −K7 or, in general, at any distance X on the cable, relative to D7 as origin, S1,3,7 could be expressed as:

−Kx, +Kx, −Kx, +Kx, +Kx, −3Kx, −Kx; where Kx represents an amplitude related to K7 and the distance X.

By extension it follows that in any word period WPy the composite device unit transmission S, at distance X on cable 1 relative to D7, could be expressed as:

*ay* K*x*, *by* K*x*, *cy* K*x*, *dy* K*x*, *ey* K*x*, *fy* K*x*, *gy* K*x*;

where Kx is defined as above and each coefficient ay, by, –, *gy* has a value in the range: −4, −3, −2, −1, 0, +1, +2, +3, according to the number and identity of device unit transmissions merged in the composite.

As shown hereafter the component device transmissions are uniquely separable from the composite by demultiplexing techniques to be described. For the present it is noted that by an exclusive allocation of foregoing code words CW*j* among the device units a system of composite multiplex signalling may be established.

I. Demultiplexing/Decoding

FIG. 9 shows a demultiplexing/decoding circuit as contemplated at 12 (FIG. 3), 23 (FIG. 4), or 32 (FIG. 5).

The multiplex composite signal is received on line 150 from one of the cables 1, 2 and associated coupler and switching apparatus (3, 6 or 20, 22 or 31, 30; according to which unit is receiving). Line 150 connects to positive and negative binary threshold detecting circuits 151 and 152, respectively. The threshold circuits are simply threshold biased switching circuits. Circuit 151 connects to Ands 153 and 154 and is so biased that it will provide enabling input to these Ands only while the signal input on line 150 has a positive magnitude relative to a positive biasing reference, $r_B$. Circuit 152 connects to Ands 155 and 156 and is so biased that it will supply enabling inputs thereto only while the signal on line 150 has a magnitude more negative than the negative biasing reference, $-r_B$. It is seen that circuits 151 and 152 have binary outputs and considered as a 2-rail combination have only three possible states representable as: 0 0, 1 0, or 0 1 corresponding to composite signal levels on line 150 respectively within, above and below the range bounded by the above-mentioned positive and negative reference magnitudes.

Ands 153 and 155 couple through Or 160 to an incrementing (count up) input 161 of a forward-backward counter 162. Ands 154 and 156 couple, via Or 163, to a decrementing (count down) input 164 of the same counter. As shown the counter has 4 stages and is therefore capable of manifesting 16 binary digital states; which may be grouped into 7 forward or positive states, 8 backward or negative states and one zero (all 0's) state, with the sign of the count state indicated in the highest order state ($2^3$).

And 153–156 are also variously conditioned by a reference binary pulse signal corresponding to a representation of one of the code words CW*j* above. The reference signal is conveyed in a two-rail from upon leads 170 and 171 and is timed in synchronism with word and element timing pulses WP, CP. Pulses CP adjustably delayed are supplied to each of the Ands 153–156 via line 172. Counter 162 is reset to the zero state (0 0 0 0) by adjustably delayed pulses WP. Input states of counter 162 are completely defined by the following table.

| 2-Rail Ternary Output of 151 | 152 | 2-Rail Binary Ref. on 170 | | Input to Counter |
|---|---|---|---|---|
| 0 | 0 | 1 | 0 | None |
| 0 | 0 | 0 | 1 | None |
| 1 | 0 | 1 | 0 | Increment |
| 1 | 0 | 0 | 1 | Decrement |
| 0 | 1 | 1 | 0 | Decrement |
| 0 | 1 | 0 | 1 | Increment |

Foregoing table indicates that coincidence of either positive threshold output at 151 and a reference level of 1 at 170 or negative threshold output at 152 and a reference of 1 at 171 yields a "match" or increment input to the counter at clock pulse time. The table further shows that coincidence of positive threshold output at 151 and 1 at 171 or negative threshold output at 152 and 1 at 170 is treated as a "no-match" condition for which the counter is decremented at clock pulse time. Finally the table shows that non-occurrence of a threshold condition at clock pulse time (i.e. composite level between positive and negative reference limits) is treated as a condition for which the count is not modified.

Or 178 and Latch 179 sample and hold the indication of the occurrence of threshold outputs during a word reception period. Adjustably delayed word timing pulses WP′ sample the state of counter 162 through Ands 180–182 at completion of each matching period. (Shortly thereafter the counter is reset by WP″). If the count accumulated in the previous matching period is exactly 0, and a count has been received (Latch 179 set), And 180 sets Alert Latch 184 thereby indicating possible occurrence of transmission or circuit error (note discussion of examples below). If the accumulated count is either negative or zero And 181 sets latch 185 to indicate No Match. If the accumulated count is positive and 182 sets latch 186 to indicate a Match. Latches 179 and 184–186 are reset by WP″ following utilization of indications therein by not shown process circuits of the respective unit.

Operation of the above demultiplexing (digital filtering) system may be understood by considering several examples. Example 1: Signal at 150 corresponds to normalized composite S1,4,6 of CW1, CW4, CW6 (i.e. +1,−1,+1,−3,+1, −1,−1) and reference input on 171 corresponds to CW1 above (i.e. 1, 0, 0, 1, 0, 1, 1). Input and count sequences are given by the following table. The positive final count in the table indicates a Match between the composite and reference (which will be understood to be accompanied by setting of latch 186 prior to resetting of the counter), indicative of the presence of CW1 as a constituent of the received composite signal. This of course signifies receipt of binary 1 intelligence from the transmitting unit which has been allocated CW1 as a basis for transmission.

| 2-Rail Ternary Signal 151 | 152 | 2-Rail Binary Ref. 170 | 171 | Counter Input | Counter(162) State | Count Value (Base 10) |
|---|---|---|---|---|---|---|
| 1 | 0 | 0 | 1 | Decrement | 1 1 1 1 | − 1 |
| 0 | 1 | 1 | 0 | Decrement | 0 1 1 1 | − 2 |
| 1 | 0 | 1 | 0 | Increment | 1 1 1 1 | − 1 |
| 0 | 1 | 0 | 1 | Increment | 0 0 0 0 | 0 |
| 1 | 0 | 1 | 0 | Increment | 1 0 0 0 | + 1 |
| 0 | 1 | 0 | 1 | Increment | 0 1 0 0 | + 2 |
| 0 | 1 | 0 | 1 | Increment | 1 1 0 0 | + 3 |

Example 2

Signal corresponds to S1,4,6 above and reference corresponds to CW2 (i.e. 1, 1, 0, 0, 1, 0, 1):

| 151 | 152 | 170 | 171 | Count In | Count State | Count Value |
|---|---|---|---|---|---|---|
| 1 | 0 | 0 | 1 | Decrement | 1 1 1 1 | −1 |
| 0 | 1 | 0 | 1 | Increment | 0 0 0 0 | 0 |
| 1 | 0 | 1 | 0 | Increment | 1 0 0 0 | +1 |
| 0 | 1 | 1 | 0 | Decrement | 0 0 0 0 | 0 |
| 1 | 0 | 0 | 1 | Decrement | 1 1 1 1 | −1 |
| 0 | 1 | 1 | 0 | Decrement | 0 1 1 1 | −2 |
| 0 | 1 | 0 | 1 | Increment | 1 1 1 1 | −1 |

The final negative count in this table (understood to be accompanied by setting of latch 185) indicates a no-match condition or equivalently transmission of binary 0 intelligence (or non-transmission) from the signalling unit presently assigned CW2.

Example 3

Signal corresponds to normalized composite S2,3 of CW2 and CW3 (i.e. −2,−2,0,+2,0,0,0) and reference corresponds to CW2:

Signal corresponds to normalized composite S2,3 of CW2 and CW3 (i.e. −2,−2,0,+2,0,0,0) and reference corresponds to CW2:

| 151 | 152 | 170 | 171 | Count In | Count State | Count Value |
|---|---|---|---|---|---|---|
| 0 | 1 | 0 | 1 | Increment | 1 0 0 0 | +1 |
| 0 | 1 | 0 | 1 | Increment | 0 1 0 0 | +2 |
| 0 | 0 | 1 | 0 | None | 0 1 0 0 | +2 |
| 1 | 0 | 1 | 0 | Increment | 1 1 0 0 | +3 |
| 0 | 0 | 0 | 1 | None | 1 1 0 0 | +3 |
| 0 | 0 | 1 | 0 | None | 1 1 0 0 | +3 |
| 0 | 0 | 0 | 1 | None | 1 1 0 0 | +3 |

Net final count with positive polarity signifies presence of CW2 in signal as component.

Example 4

Signal corresponds to S2,3 with injection of unit noise underscored in third pulse interval, i.e. −2,−2,+1,+2,0,0,0; and reference corresponds to CW1:

| 151 | 152 | 170 | 171 | Count In | Count State | Count Value |
|---|---|---|---|---|---|---|
| 0 | 1 | 0 | 1 | Increment | 1 0 0 0 | +1 |
| 0 | 1 | 1 | 0 | Decrement | 0 0 0 0 | 0 |
| 1 | 0 | 1 | 0 | Increment | 1 0 0 0 | +1 |
| 1 | 0 | 0 | 1 | Decrement | 0 0 0 0 | 0 |
| 0 | 0 | 1 | 0 | None | 0 0 0 0 | 0 |
| 0 | 0 | 0 | 1 | None | 0 0 0 0 | 0 |
| 0 | 0 | 0 | 1 | None | 0 0 0 0 | 0 |

Final count value of zero above (accompanied by setting of latches 179, 184 and 185) signifies probable mutation of signal and is also interpreted correctly as a non-match indication of non-occurrence of CW1 in composite signal. Note that without the noise mutation no count would have been transferred in the third step.

Exhaustive calculations by programmed computation indicate that for the above transorthogonal code:

1. There is an exact one-to-one correspondence between each possible unmutated analog composite sequence and the associated 2-rail ternary signal sequence derived therefrom.
2. Therefore the 2-rail ternary sequences corresponding to the unmutated composites can be analyzed with 100 percent accuracy in filter circuits as shown in FIG. 9.
3. A zero count accumulated in the counter section of the digital matched filter has significance as both a noise indication and a meaningful non-match indication.
4. For all possible single injections of unit level noise in any composite the accuracy of analysis of the corresponding ternary signals reduces to 50 percent for composites formed from more than four code word sequences and remains 100 percent for composites of four or fewer code word sequences.

J. Synchronization

Circuits for synchronizing device units and channel units are indicated in FIGS. 10 and 11. The circuits in FIG. 10 essentially comprise a digital matched filter for comparing code word signals from CH3, received as synchronizing signals at terminal 201, with internal reference pulse signals supplied from the third stage of feedback shift register 202. Terminal 201 corresponds to the terminal $V_{OUT}$ indicated in FIG. 7. Circuits in FIG. 10 represent synch decoding and timing circuits used in both the device units indicated in FIG. 3 and the channel units other than CH3 indicated in FIG. 4.

The synchronizing signals at 201 are applied to a threshold comparator circuit 203 having a two-rail binary output 204, 205. Lines 204, 205 connect to respective Ands 206, 207. Ands 206, 207 are further conditioned by complementary outputs of the third stage of feedback shift register 202 and receive therefrom reference pulse signals having arbitrary phase in relation to the signals received at 201. Ands 206, 207 are further conditioned by bit clock pulses CP originated elsewhere in FIG. 10.

Consequently, outputs of Ands 206 and 207 are pulses which indicate matching states of individual pulse elements of the synchronizing and reference signals. Such match indicating outputs are supplied as increment inputs to a lowest order (2°) stage of 3-stage (forward only) counter 209. The counter may be arranged to count in the ordinary binary system of notation. Thus it will hold a count state of 1, 1, 1 (decimal 7) upon receiving seven counts; assuming its initial count state to be zero (0, 0, 0). Count state 1, 1, 1 is sampled by a clock pulse CP in And 210 to form the word pulse WP.

When the clock pulses CP and the shift pulses applied to register 202 are adjusted in timing and sequence phase in the manner to be described the pulses CP and WP of the subject unit are essentially coordinated with pulses CP and WP of all other units of the system and respectively define pulse and word intervals of generation of subject PN code word sequences.

Pulses CP may be derived from an oscillator such as 212 having phase lock circuit means 213 for controlling the phase of the oscillator output within a pulse interval. The pulse repetition rate should of course correspond to the pulse repetition frequency of the pseudonoise code signals of the subject signalling system. Circuit 213 may be controlled by transitions of the pulses received from CH3 at 201. Delay 214 is adjusted appropriately at system installation to coordinate the timing phase of pulses CP in the subject unit relative to CH3. Adjustment is effected by establishing CP as reference timing of subject device (respectively channel) unit transmissions (respectively receptions) relative to reception of such transmissions at CH3 (respectively a selected device unit). Additional adjustments of delay 215 relative to CH3 establish timing of pulses CP to coordinate timing of device unit receptions of channel unit transmissions.

Register 202 is reset initially to an arbitrary one of the initial code states indicated in paragraph G above (e.g. 1, 1, 1) and thereafter shifted in a cyclic code word sequence by shift pulses derived from clock pulses transferred selectively through And 221 to shift input 222 of register 202. And 221 is inhibited (disabled) by active output from And 224. Output of And 224 is activated by coincidence of a 1, 1, 1 shift state in register 202, represented by active output from And 226, and non-occurrence of WP. Output of And 226 delayed is connected to reset input of counter 209.

Accordingly, referring to the shift state table contained in paragraph G above, it may be seen that at instances of occurrence of arbitrarily selected shift state 1, 1, 1 input of a shift pulse to register 202 from And 221 will be prevented if output of And 224 is active (i.e. if shift state 1, 1, 1 is not coincident with a word pulse WP). Consequently since counter 209 is reset after each cycle of shifting marked by shift state 1, 1, 1 the shifting and counting sequences are progressively adjusted by the skipping of a shift input until sequence phases of register 202 and input signal 201 become coordinated. Only then will counter 209 reach the count state 1, 1, 1 cyclically and produce the pulses WP.

As all device and channel units except CH3 have Ands such as 226 for conditioning the shift-skipping function upon 1, 1, 1 states of respective shift registers such as 202, all will be effectively coordinated in word phase.

As suggested at 230 the foregoing timing system can be elaborated to provide for monitoring of the frequency of drift of the system by monitoring th rate of occurrence of shift inhibiting pulses at output of And 224. Loss of synchronization due to system malfunction may be detected thereby and utilized as failure indication. Other refinements will become immediately apparent.

FIG. 11 indicates the timing circuits of CH3. Register 248 is a feedback shift register with feedback through Mod. 2 adder 250. Synchronizing pulses (VOUT) are derived from the third stage of register 248 and coupled to cable 1 for directional transmission to the device units and other channel units. Word pulses WP are derived from And 251 at shift state 1, 1, 1 of register 248. Thus, word phase coordination of all units is completed.

Clock pulses CP/CH3 are supplied by oscillator 254. For installation adjustment of device unit pulse transmissions And 255 receives directional transmissions of the device units via cable 1. Device unit delays 214,215 (FIG. 10) are respectively adjusted to establish coordinated relative timing of device unit multiple transmissions to the channel units and device unit reception of channel unit multiplex transmissions. Channel unit multiplex transmissions and receptions are coordinated indirectly by adjustments of delays 214,215 in CH1 and CH2 relative to a designated adjusted device unit.

K. Amplitude Equalization and Threshold Adjustments

Device unit transmissions are adjusted in relative amplitude by installation adjustments of resistances 256 (FIG. 7) in individual device unit diplexing circuits. The individual adjustments are made by monitoring individual device unit transmissions as received at one channel unit (e.g. CH3) and establishing predetermined threshold reception levels in CH3 for all device units by varying respective attenuating resistances in the device units. The demultiplexing thresholds of the other channel units are then adjusted relative to transmissions of one device unit.

Channel unit transmissions are adjusted simularly to relatively equalized levels by individual adjustments of transmission levels referenced to predetermined demultiplexing reception levels at one device unit. Demultiplexing thresholds in the other device units are thereafter adjusted relative to transmissions of one of the adjusted channel units.

L. Code Word Allocation

In the embodiment of FIG. 2 the seven code words CW1-CW7 of the exemplary length 7 transorthogonal code (paragraph G above) are allocated individually to the device units as channels of communication for device unit transmissions (cable 1). The same words are employed by the channel units to convey multiplex transmission on cable 2 to the device units respectively associated with the words.

Figure 12:
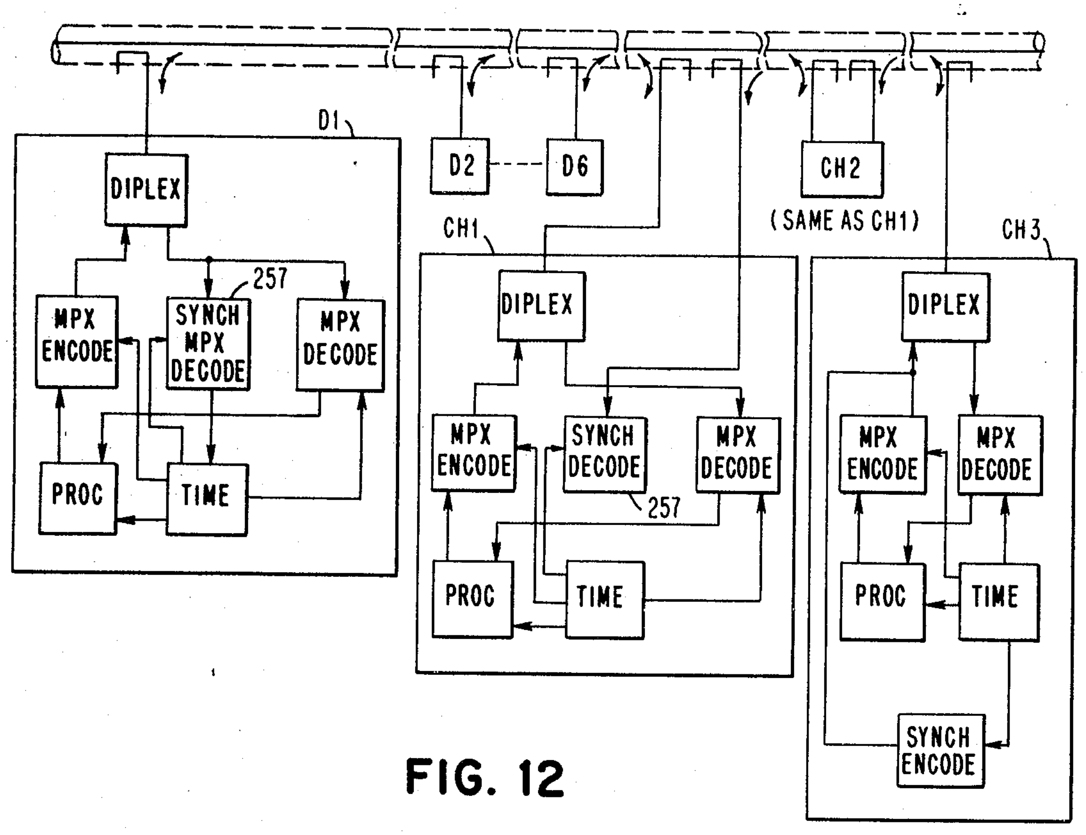
FIG. 12 is a generalized schematic of an alternate amplitude-multiplex signalling configuration employing a single cable for all inter-unit signalling functions.

It will be appreciated that the need for the second cable 2 arises only because the synch transmission from CH3 is encoded as a code word. Obviously, if six code word channels are sufficient to carry all channel unit multiplex transmissions (i.e. if there were only six device units) the second cable would be superfluous and the single cable organization of FIG. 12 could be used to accomplish all inter-unit transmissions. It is noted however that the synch decoding circuits 257 of FIG. 12 should be a complete decoding filter such as the circuit of FIG. 9 rather than the simplified circuit of FIG. 10, as it must be able to distinguish the synch word transmission from CH3 within the composite multiplex transmission of all channel units.

The allocation of code words or code "slots" may be either constant or dynamically varied in a manner analogous to the allocation of time slots in time division systems. Thus for example a channel unit (or device unit) containing multiple independently operable encoding circuits, each arranged as indicated in FIG. 8, and multiple associated coupling circuits, could be allocated multiple code word "slots" when its traffic is relatively more demanding.

Individual receiving units may also be equipped with multiple matched filter circuits (each organized as in FIG. 9) tuned to different code word "slots". In effect the equivalent of multiple parallel cable would be formed when a pair of such communicating units is allocated multiple code words for a higher speed communication.

The mechanics of allocation is considered optional and not material to the invention. For most purposes selection of code word encoding and decoding sequences by manual switching will be adequate. For faster selection one of the channel units can be operated as a master unit and programmed to automatically supervise allocations. Supervision would entail communication of re-allocation intelligence in the amplitude multiplex transmissions of the master unit. The other channel units could be reached indirectly by having re-allocation messages relayed from the master through a device unit. Alternately, a master allocation list could be provided in the central processor and the channel units and associated device units would derive re-allocations therefrom.

By dynamic allocation of code words on a word cycle by word cycle basis it would be possible to time-multiplex amplitude multiplexed transmissions. Such as arrangement might be employed to secure additional privacy in communication or to enlarge the traffic capability of an existing time division network.

As mentioned previously the 2-rail ternary signal provided by the threshold circuits in demultiplexing (FIG. 9) has one-to-one correlation correspondence to the single rail "analog" composite signal from which it is derived. Accordingly, it is immaterial whether the conversion to 2-rail ternary form is made at the receiving units or in a "conversion" unit positioned in the path of the analog composite transmission.

Indeed it is also contemplated that the composite may be simply hard-limited before transmission in analog form to range in amplitude over a range just slightly greater than the range defined by the receiving threshold circuits.

When permitted by other system consideration each of the foregoing "clipping before sending" arrangements would enhance performance by reducing the dynamic range of the composite transmission.

Example of Embodiment - Length 15 Code

Figures 14, 16:
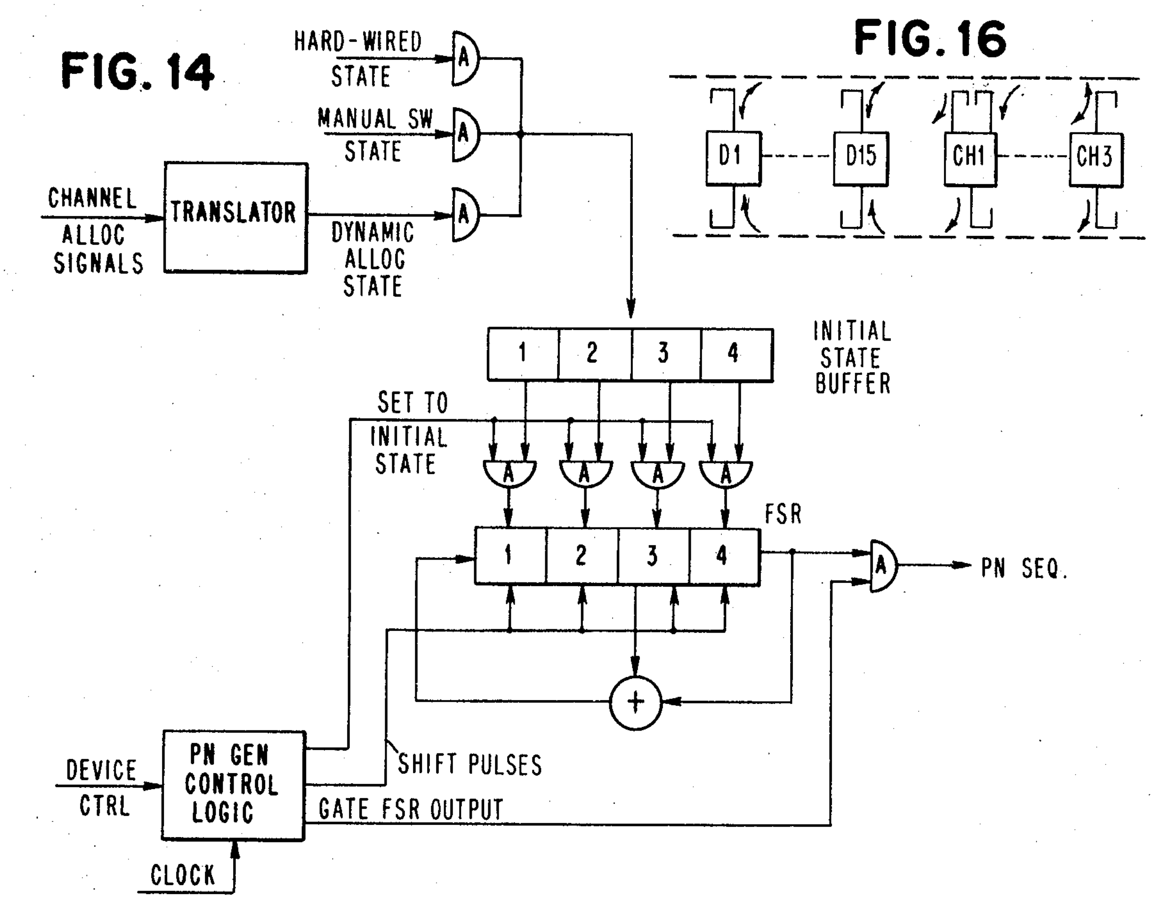
FIGS. 14–16 are schematics of another embodiment of the invention based upon a PN code of length 15.
Figure 15:
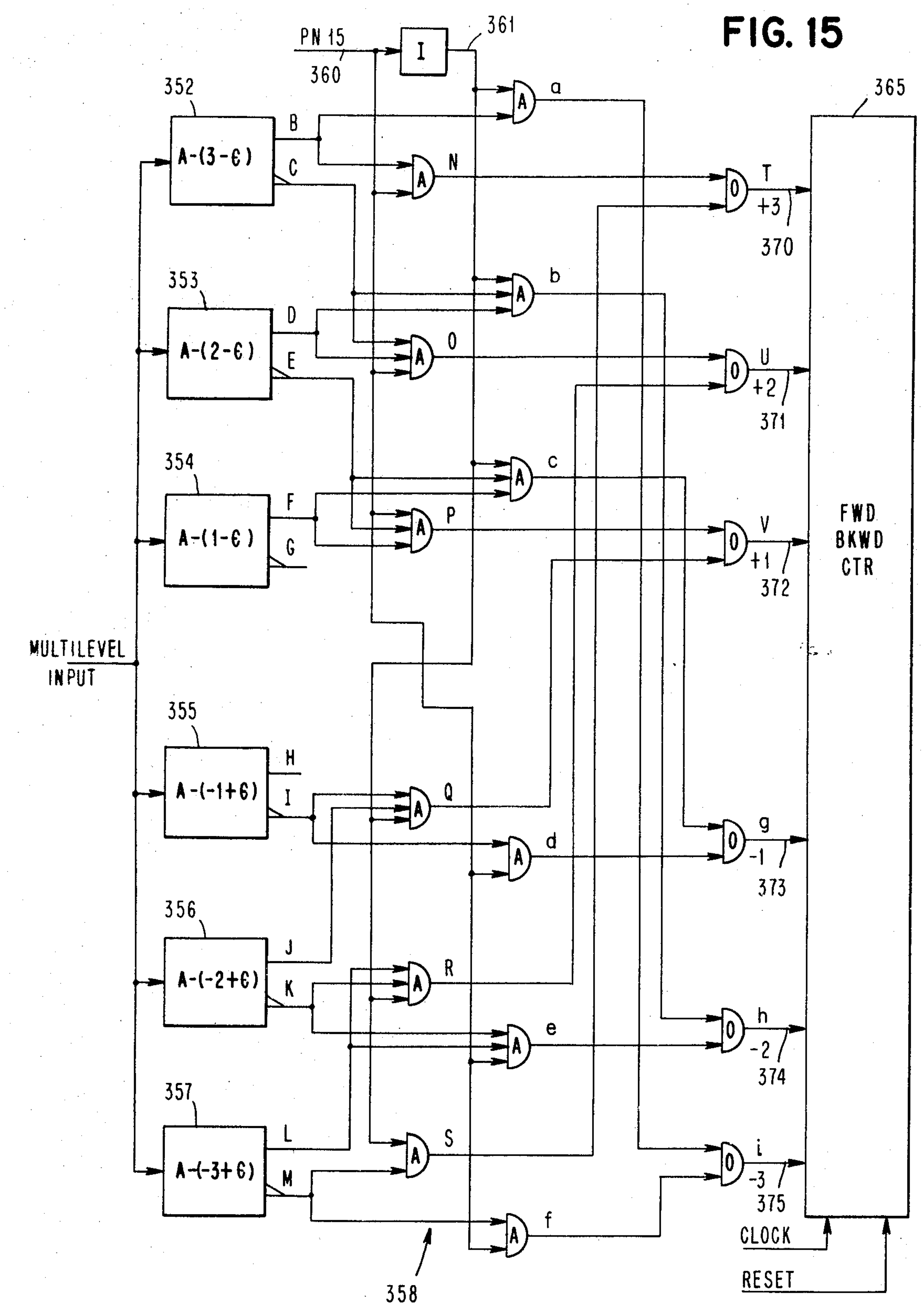

FIGS. 14-16 indicate a system organization for amplitude multiplex handling of a length 15 orthogonal code. Feedback shift registers FSR for the encoding process have four stages as shown in FIG. 14. Matched filter demultiplex/decoding circuits are organized along the lines suggested in FIG. 15. FIG. 16 indicates the system overall and its cabling.

The 15 possible initial states of the FSR registers in FIG. 14 and the associated code word sequence outputs of the fourth stage of the register are illustrated by the following table.

354, 355 for the range $\pm 1$ units). These ternary indications are applied to logic circuit net 358 together with two-rail binary reference signals on leads 360, 361. Relatively exclusive counting inputs are supplied by net 358 to forward-backward counter 365. The six counter inputs 370–375 operate to produce respective equivalents of 3, 2 and 1 forward count increments and 1, 2, and 3 reverse count decrements in response to pulses translated to respective inputs by net 358. In other respects the operation of the counter and treatment of its output correspond to the operation and treatment indicated in FIG. 9.

We have shown and described above the fundamental novel features of the invention as applied to several preferred embodiments. It will be understood that various omissions, substitutions and changes in form and detail of the invention as described herein may be made by those skilled in the art without departing from the true spirit and scope of the invention. It is the intention therefore to be limited only by the scope of the following claims.

What is claimed is:

1. In an amplitude multiplexed intelligence transmission system, including a multiplex signal conductor carrying composite transmissions of sequences of multiple amplitude pulses in individual time slots of a succession of undivided time slots with each composite transmission formed by superposed combination of selective pulse code mudulated transmissions of a plurality of separate signalling sources, said selective source transmissions having modulation corresponding to relatively distinct code words of a particular code selected from the class of orthogonal, biorthogonal and transorthogonal pulse codes, a receiver comprising:

at least two binary threshold comparator circuits

TABLE

| PN sequence phase | | | | | | | | | | | | | | | Reset state FSR stage | | | |
|---|---|---|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 1 | 2 | 3 | 4 |
| −1 | −1 | −1 | −1 | 1 | 1 | 1 | −1 | 1 | 1 | −1 | −1 | 1 | −1 | 1 | −1 | −1 | −1 | −1 |
| 1 | −1 | −1 | −1 | −1 | 1 | 1 | 1 | −1 | 1 | 1 | −1 | −1 | 1 | −1 | −1 | −1 | −1 | 1 |
| −1 | 1 | −1 | −1 | −1 | −1 | 1 | 1 | 1 | −1 | 1 | 1 | −1 | −1 | 1 | −1 | −1 | 1 | −1 |
| 1 | −1 | 1 | −1 | −1 | −1 | −1 | 1 | 1 | 1 | −1 | 1 | 1 | −1 | −1 | −1 | 1 | −1 | 1 |
| −1 | 1 | −1 | 1 | −1 | −1 | −1 | −1 | 1 | 1 | 1 | −1 | 1 | 1 | −1 | 1 | −1 | 1 | −1 |
| −1 | −1 | 1 | −1 | 1 | −1 | −1 | −1 | −1 | 1 | 1 | 1 | −1 | 1 | 1 | −1 | 1 | −1 | −1 |
| 1 | −1 | −1 | 1 | −1 | 1 | −1 | −1 | −1 | −1 | 1 | 1 | 1 | −1 | 1 | 1 | −1 | −1 | 1 |
| 1 | 1 | −1 | −1 | 1 | −1 | 1 | −1 | −1 | −1 | −1 | 1 | 1 | 1 | −1 | −1 | −1 | 1 | 1 |
| −1 | 1 | 1 | −1 | −1 | 1 | −1 | 1 | −1 | −1 | −1 | −1 | 1 | 1 | 1 | −1 | 1 | 1 | −1 |
| 1 | −1 | 1 | 1 | −1 | −1 | 1 | −1 | 1 | −1 | −1 | −1 | −1 | 1 | 1 | 1 | 1 | −1 | 1 |
| 1 | 1 | −1 | 1 | 1 | −1 | −1 | 1 | −1 | 1 | −1 | −1 | −1 | −1 | 1 | 1 | −1 | 1 | 1 |
| 1 | 1 | 1 | −1 | 1 | 1 | −1 | −1 | 1 | −1 | 1 | −1 | −1 | −1 | −1 | −1 | 1 | 1 | 1 |
| −1 | 1 | 1 | 1 | −1 | 1 | 1 | −1 | −1 | 1 | −1 | 1 | −1 | −1 | −1 | 1 | 1 | 1 | −1 |
| −1 | −1 | 1 | 1 | 1 | −1 | 1 | 1 | −1 | −1 | 1 | −1 | 1 | −1 | −1 | 1 | 1 | −1 | −1 |
| −1 | −1 | −1 | 1 | 1 | 1 | −1 | 1 | 1 | −1 | −1 | 1 | −1 | 1 | −1 | 1 | −1 | −1 | −1 |

The matched filter decoding circuits (FIG. 15) are more elaborate than corresponding circuits in the length 7 code embodiment (FIG. 9). Six threshold circuits 352–357 provide three pairs of binary outputs each pair having ternary significance. The outputs indicate discrete threshold level states of the multilevel composite above, between and below respective amplitude bounds (one pair 352, 357 for the range $\pm 3$ units, one pair 353, 356 for the range $\pm 2$ units and one pair coupled in parallel to said signal conductor for distinguishing amplitudes of said received composite transmission falling above and below respective upper and lower threshold limits represented by biasing conditions of said circuits;

a source of sequences of reference pulse code modulated signals; and means consisting exclusively of binary logic switching circuits coupled to the binary outputs of said threshold circuits and said source and responsive to the combination thereof for calculating correlation coefficients of said composite transmissions and said source sequences.

2. In a digital information processing system, including multiple sources of information signals to be handled in multiplex composite form and multiple receiving units capable of receiving said information in said composite form and extracting the information of individual sources, in combination:

multiple (up to $2^n-1$) sources of digital signal sequences of length $2^n-1$ (n greater than 2) having a bipolar pulse form; said sources operating selectively; issuance or non-issuance of a said sequence representing the value of one data bit to be transmitted from a respective source to at least one of the receiving units; the sequences of different said sources being representations of distinct code words of one orthogonal, biorthogonal or transorthogonal code;

means including a plurality (less than $2^n-1$) of threshold detection circuits responsive to different amplitude levels of the pulses of said analog sequence to produce a like plurality of parallel binary pulse signal sequences containing in combination all of the source data bit information of the composite in a form subject to extraction by binary correlation handling; and at least one receiving unit consisting exclusively of binary handling circuits coupled to receive said parallel trains of binary pulse signals and to extract therefrom information corresponding to the individual data bit transmissions of said multiple code word sources by correlation filtering operations involving only binary handling functions.

3. A system according to claim 2 wherein said sequence sources are located at various different transmission distances relative to said threshold circuits and are maintained in isochronal and amplitude-equalized transmitting relationships inter se in order to selectively provide time synchronous and amplitude equalized signal elements for combination into said composite.

4. In an information processing system containing a medium of communication serially linking a plurality of sources of binary information pulse signals and a plurality of associated receiving units in a serial type multiplex signalling network, the improvement comprising:

means establishing isochronal timing relationships and amplitude equalizing relationships between said sources;

respective means at up to $2^n-1$ of said sources ($n$ greater than 2) coupled to said medium cooperative with said establishing means to selectively produce and transmit via said medium equalized amplitude binary pulse signal sequences of digit length $2^n-1$ representing distinct code words of an orthogonal, biorthogonal or transorthogonal code; said pulse signals having bipolar form consisting of manifestations of equal positive and negative amplitude conditions; said code word representations produced selectively by individual said sources in corresponding time intervals being subject to being combined in said medium into a composite sequence of $2^n-1$ multi-amplitude analog pulses by algebraic addition of amplitudes of individual bipolar pulses; said composite sequence containing all of the source information represented by the selective production and non-production of the individual bipolar sequences;

respective means at said receiving units responsive to said composite sequence to convert said composite sequence to plural (less than $2^n-1$) sequences of binary pulses, said parallel binary sequences in combination containing all of the source information of said composite in a form eligible for extraction by binary handling; and binary correlation filtering means in said receiving units for extracting from said parallel binary sequences in combination the information represented by the bipolar transmissions of the individual sources.

5. A system according to claim 4 wherein each said binary processing circuit comprises a forward backward counting circuit with plural counting inputs arranged to receive said plural binary sequences and a reference sequence.

6. In a network of binary data processing circuits in combination:

$m$ discrete data transmission sub-networks comprising:

.$m$ binary data signal channels;

.$m$ relatively synchronized respective sources of repetitively presented code word function signals representing distinct respective words of a predetermined code having an orthogonal, transorthogonal or biorthogonal property;

.$m$ respective means for logically multiplying the respective code word functions by the data signals in respective said channels;

means for linearly combining the outputs of said m multiplying means in precise time overlap to produce a composite transmission pulse representation subject to ranging in amplitude over a range of m discrete amplitude levels; and a reception sub-network comprising:

.first and second threshold discrimination circuits receiving said $m$-level composite transmission and responsive to particular amplitude conditions thereof to provide distinct first and second binary output representations; the first discrimination circuit responding to composite amplitudes in excess of a first level and the second discrimination circuit responding to composite amplitudes exceeded by a second level; said first level exceeding said second level; said first and second levels encompassing a range of three levels of said composite range of $m$-levels; and a binary correlation circuit coupled to said threshold discrimination circuits for logically translating said first and second binary output representations by binary logical manipulations into binary data functions corresponding faithfully to said data signals in said channels.

7. A data signalling organization according to claim 6 wherein said data transmission and reception subnetworks are all relatively remote from each other and said combining means comprises a transmission line having coupling connections to outputs of said multiplying means and inputs of said discrimination circuits.

8. A data signalling organization according to claim 6 wherein said correlation circuit of said reception subnetwork comprises:

a source of repetitively manifested binary code word reference signals corresponding to one of said function signals and synchronized with said received m-level composite;

a forward-backward counter; and means for selectively incrementing or decrementing said counter, for each pulse element of said composite having amplitude exceeding or exceeded by respective said first and second levels, according to a logical selection function conditioned according to predetermined logic rules upon the coincident states of said discrimination circuit outputs and said reference code word signal.

* * * * *